(No Model.)  2 Sheets—Sheet 1.

D. W. WOODS.
CAR BRAKE.

No. 257,803. Patented May 9, 1882.

Attest.
Charles Pickles
Geo. H. Knight

Inventor:
Daniel W. Woods
By
Knight Bros.
Attys.

(No Model.) 2 Sheets—Sheet 2.

D. W. WOODS.
CAR BRAKE.

No. 257,803. Patented May 9, 1882.

Attest:
Charles Pickles
Geo. H. Knight.

Inventor:
Daniel W. Woods
By Knight Bro.
Attys

UNITED STATES PATENT OFFICE.

DANIEL W. WOODS, OF ST. LOUIS, MISSOURI.

CAR-BRAKE.

SPECIFICATION forming part of Letters Patent No. 257,803, dated May 9, 1882.

Application filed March 18, 1882. (No model.)

*To all whom it may concern:*

Be it known that I, DANIEL W. WOODS, of the city of St. Louis, in the State of Missouri, have invented a certain new and useful Improvement in Car-Brakes, of which the following is a full, clear, and exact description, reference being had to the accompanying drawings, making part of this specification.

My improvement consists of a mechanism by which the brake may be applied at will to either two or four wheels of each of the trucks upon which the car-body is supported, said brakes being set and released by turning a single hand-wheel.

Figure 1:
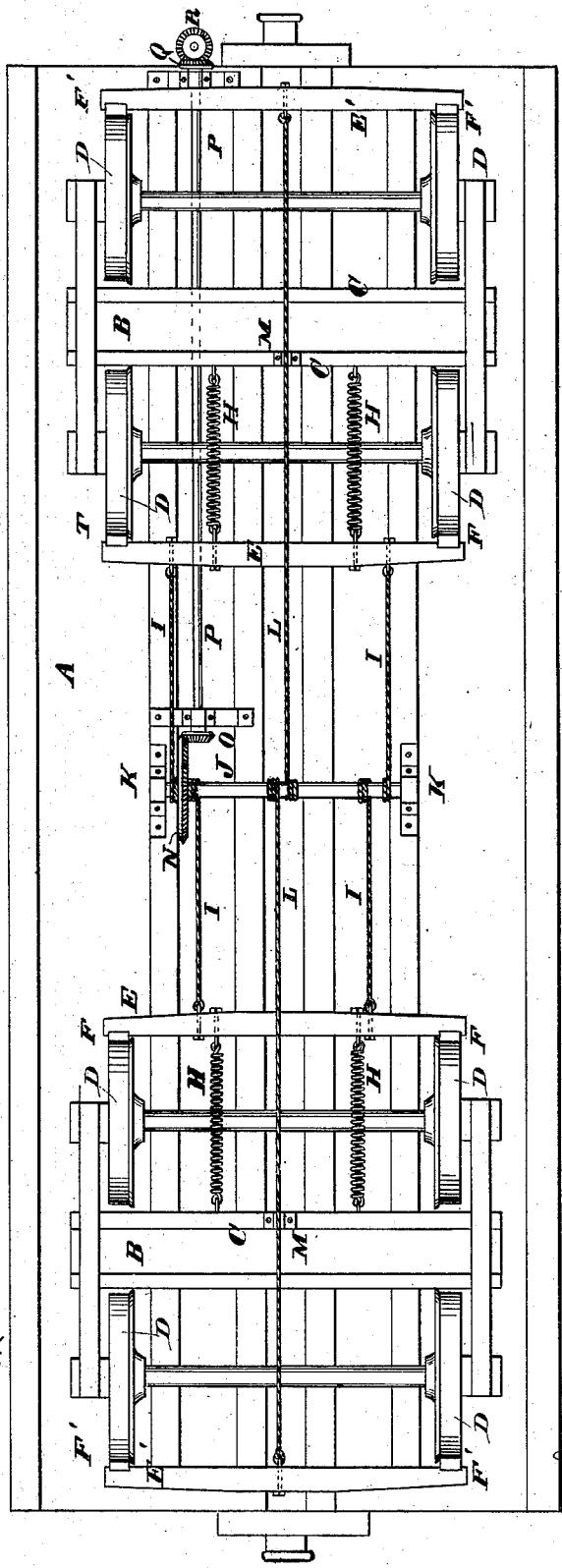
Figure 2:
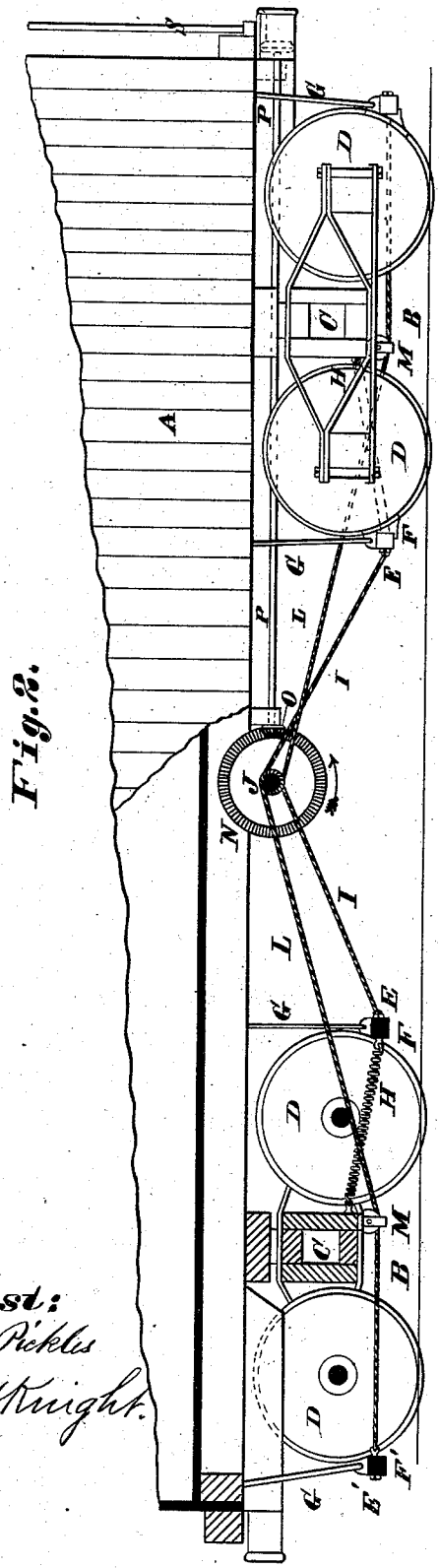
Figure 4:
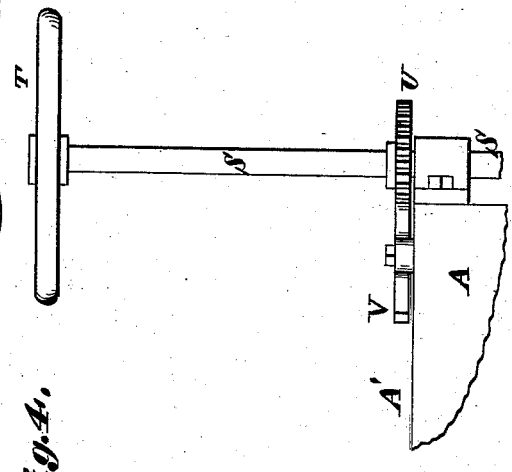
Figure 3:
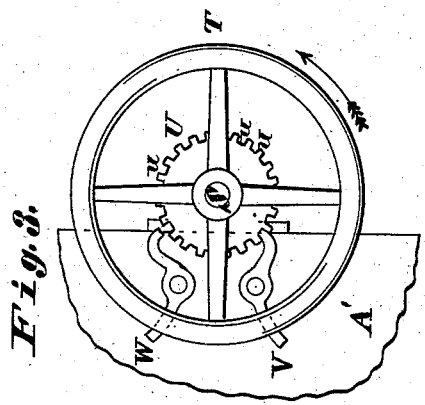

In the drawings, Figure 1 is a bottom view of a car with my system of brake mechanism. Fig. 2 is part inside view and part in longitudinal section. Fig. 3 is an enlarged top view of the hand-wheel, and Fig. 4 is a side view of the same.

The car-body is marked A and the car-roof A'. The two trucks B B have each a central bridge-beam, C, and wheels D. E and E' are the brake-bars, and F F' the brake blocks or shoes. G are the links or hangers on which the brake-bars are supported. The above-mentioned parts may be of ordinary or any suitable construction.

H are springs connecting the brake-bar E to the bridge-beam C. These springs act (when the brake-bar is not held back, as hereinafter set forth) to apply the brakes with sufficient force to the wheels for braking purposes.

I are chains or cables extending from the brake-bars E to a transverse shaft, J, suspended on hangers or brackets K from the bottom of the car-body. The chains I are attached to the shaft, and are coiled around it, so that when the shaft is turned in the direction of the arrow, Fig. 2, the chains are coiled up upon the shaft to draw back the brakes F from the wheels.

L are chains or cables coiled upon the shaft J in the contrary direction to the chains I, so that as the chains I are coiled up upon the shaft those L will be uncoiled therefrom, and vice versa. Thus it will be seen that to set up the brakes the shaft J is turned in the opposite direction to the arrow, which uncoils the chains I therefrom, allowing the springs H to act and coils up the chain L, thus setting the brakes F' by positive force and the brakes F by the force of the springs. I prefer to so adjust the relative length of the lines or chains I and L that the two brakes F shall reach the wheels before the two brakes F', so that a mere release of the hand-wheel shaft from the dog V shall cause the setting of the brakes F by the action of the springs H. An additional movement of the hand-wheel in the same direction will cause the setting up of the two brakes F'. Thus only two or all four brakes can be set upon each truck, as may be required. It will be seen that the inclination of the hanger-links G, by which the brake-bar E' is suspended, will cause these brakes to fall back from the wheel by the force of gravity; but a spring or springs may be applied to hold these brakes F' from contact with the wheel when the chain L is slack. I run the chains L under suitable guide-pulleys, M, beneath the bridge-beam.

I will now describe my mechanism for turning the shaft J; but I do not confine myself to any special mechanism for this purpose, for it will be readily understood that it admits of many modifications without any essential change of principle.

N is a bevel-wheel upon the shaft J, engaging with a bevel-wheel, O, upon the horizontal shaft P. The shaft P carries a bevel-wheel, Q, engaging with a bevel-wheel, R, upon the vertical hand-shaft S.

T is the hand-wheel upon the shaft S, and U is a dog-wheel upon the same, having marginal notches $u$ to receive the points of the dogs V and W. The hand-wheel is shown in position to be used by a person upon the roof A' of the box-car; but with flat cars or passenger-cars the hand-wheel would be located so as to be reachable from the floor or platform.

When the parts are in the position shown all four brakes are applied to each truck, and the hand-shaft is prevented from turning to release them by the dog W. If the dog W is now disconnected from the dog-wheel U and parts left to assume the position to which they tend, the brakes F' will be released from contact with the wheels D; but the brakes F will still be forced against the wheels by the springs H. To release the brakes F the wheel T is turned in the direction of the arrow, Fig. 3, and the dog V engaged with the dog-wheel to hold the brakes F in their disengaged or backward position.

As modifications, the cog-wheel R of the hand-shaft S may have direct engagement with the wheel N, or the chains I and L may be coiled directly on a vertical hand-shaft.

I claim as my invention—

1. The two trucks B, with springs H and brake-bars E and E', connected to a central shaft, J, by chains I and L, wound on the shaft in opposite directions.

2. The brake-bars E and E', springs H, forcing the brake-bar E toward the wheels, chains I and L, extending from the brake-bars E E' to a shaft, J, and wound in contrary directions thereon, in combination with a suitable operating mechanism—as hand-shaft S, wheels R Q O N, and shaft P.

3. The combination of trucks B B, body A, brake-bars E E', chains I L, shaft J, cog-wheels N O Q R, shafts P and S, hand-wheel T, and holding device U V W, or their mechanical equivalents, for the purposes set forth.

DANIEL W. WOODS.

Witnesses:
 SAML. KNIGHT,
 GEO. H. KNIGHT.